July 8, 1952     H. R. LARSEN ET AL     2,602,229
TRUNNION BEARING
Filed April 2, 1947     2 SHEETS—SHEET 2
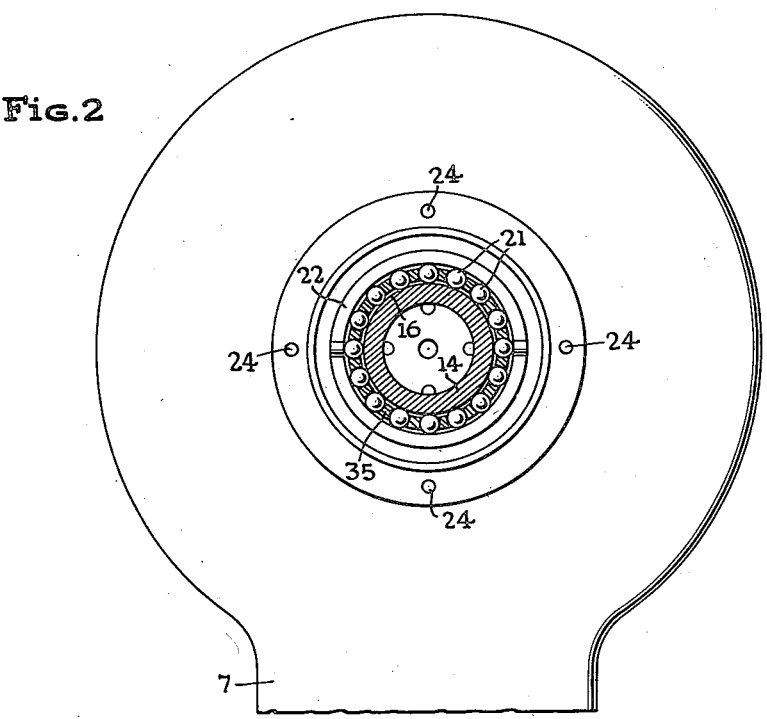
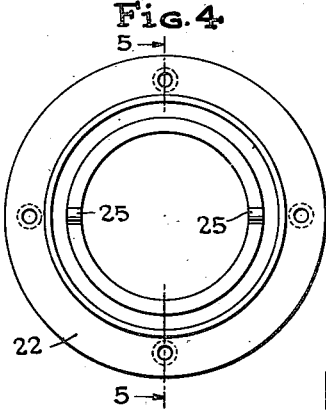
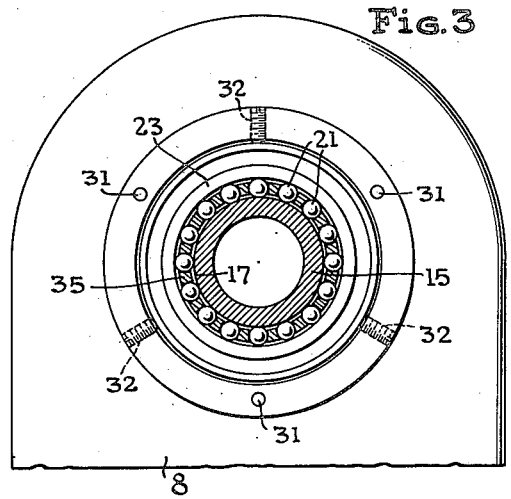
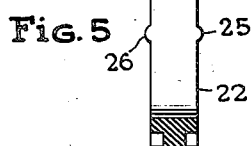
Inventor
Harold R. Larsen
and Daniel Gurney
Attorneys Patented July 8, 1952

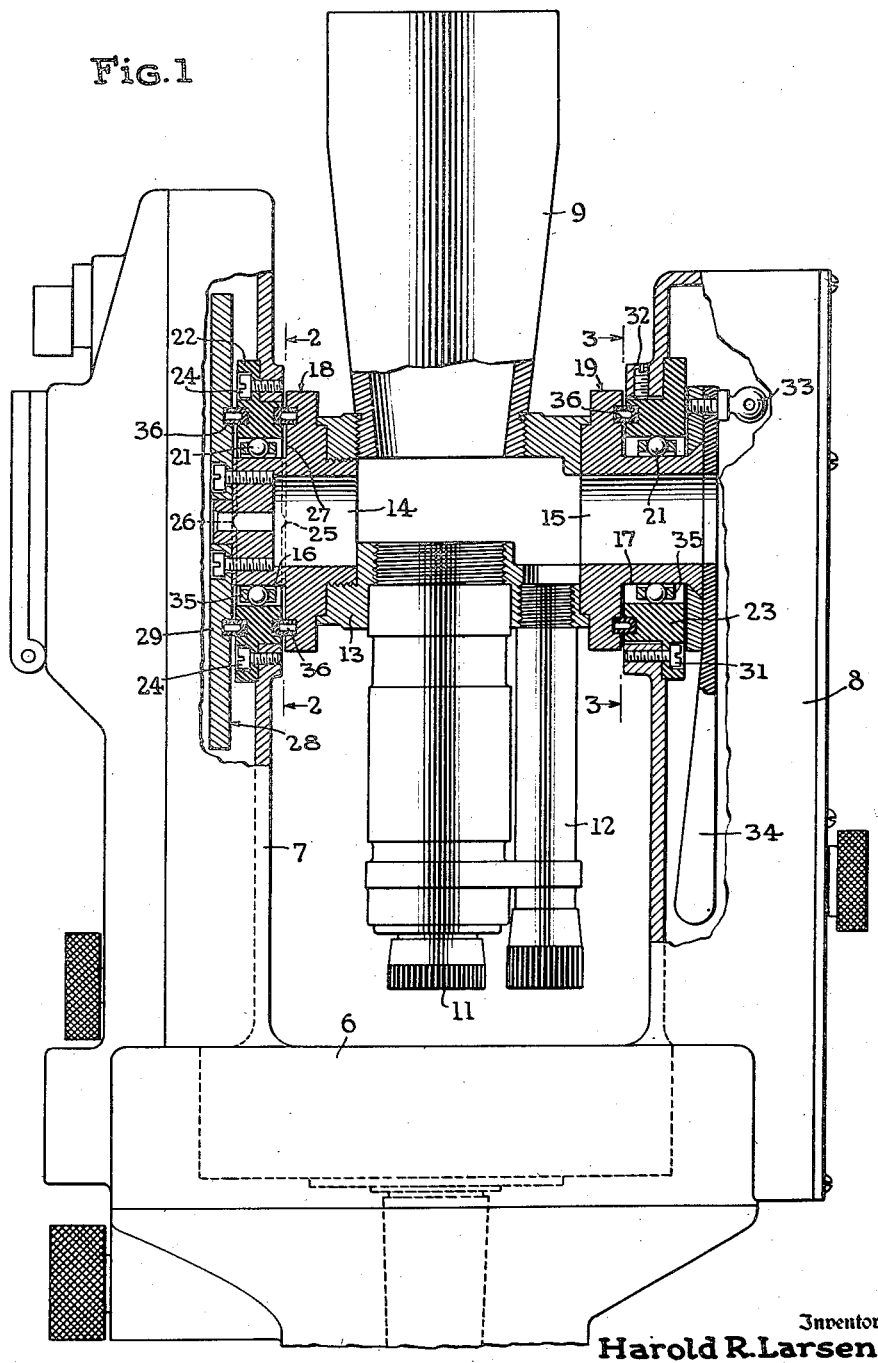

2,602,229

UNITED STATES PATENT OFFICE 2,602,229

TRUNNION BEARING

Harold R. Larsen, Troy, and Daniel Gurney, Jamestown, N. Y., assignors to W. & L. E. Gurley, Troy, N. Y., a corporation of New York Application April 2, 1947, Serial No. 739,034

5 Claims. (Cl. 33—46)

This invention relates to geometrical instruments of the light-ray type and particularly to transits and theodolites.

The patent to Larsen and Sonderman #2,363,877, issued November 28, 1944, describes an optical micrometer which will measure angles without interpolation to one second of arc. As a consequence of this high precision of measurement there is now need for greater accuracy of the bearings on which the movable elements of the surveying instrument are mounted. The invention provides an instrument having free turning bearings of great accuracy.

As a basis for disclosure and discussion, the invention will be described as applied to the trunnion bearings which support the telescope of a theodolite. In the past it has been customary to use plain bearings of the precision type to support the trunnions on the standards. No matter how precise such a bearing may be, some clearance between the journal and the bearing is an absolute necessity. Thus, when the telescope is swung on its trunnions there is a minute tendency for the journals to climb in the bearings. If a tangent screw and clamp are used they must be located nearer one than the other of the two trunnion bearings. Since the tangent screw does not develop a balanced torque, the effect is to cause one trunnion journal to climb more than the other. The effect is to produce a lateral deflection of the telescope measurable in amount, and very objectionable.

In first order survey work, it is common practice to avoid use of the tangent screw and to position the telescope by tapping it with the finger. The bearing problem is further complicated by the fact that one of the trunnion bearings must be adjustable vertically through a very limited range. This fact imposes a definite limit on the closeness of fit of both trunnion journals in their bearings.

The present invention is based on the concept that precision requires the elimination of all bearing clearance. To attain this result, recourse has been had to a pre-loaded ball bearing, which is specially designed to permit the required adjustment of one of the bearings. The principal novel feature is that the ball races on the trunnions are cylindrical surfaces and the opposed race surfaces carried by the standards are also cylindrical. The balls are spaced and held in circular series by retainers which engage only the balls, and which are so dimensioned that the retainers and the balls may move within a moderate range in the direction of the common axis of the trunnions. It can be demonstrated that the range of vertical adjustment of the adjustable bearing is so slight that the preloading of the balls is not affected in any material degree by this adjustment.

Bearings of the type just described do not retain the trunnions against axial motion, so the second feature of the invention is the provision of compatible means which are effective to prevent axial motion of the trunnions in all adjusted positions of the adjustable bearing.

The invention will now be described as embodied in the bearings for the horizontal axis of a theodolite.

In the drawings:

Fig. 1 is a view partly in elevation and partly in section, showing how the telescope is mounted on trunnion bearings in the side standards of a theodolite;

Fig. 2 is a section on the line 2—2 of Fig. 1;

Fig. 3 is a section on the line 3—3 of Fig. 1;

Fig. 4 is a face view of the bearing race of the non-adjustable trunnion bearing; and Fig. 5 is a section on the line 5—5 of Fig. 4.

In the drawing, the base or alidade of the instrument is indicated at 6, and carries two standards 7 and 8. These standards are shown as of a hollow configuration used to house the optical micrometer mechanism disclosed in the Larsen and Sonderman patent, above mentioned, but not illustrated in the drawing of the present application. The standard 7 carries the fixed or non-adjustable bearing. The standard 8 carries the adjustable bearing, and it may be mentioned at this point that the adjustment is made in a vertical direction.

The telescope of the theodolite is shown at 9, and has an eye-piece 11. The small telescope indicated at 12 is the reading telescope for the optical micrometer and requires no further discussion. The two end portions of the main telescope tube are threaded into an axis bar 13, which commonly would be formed of aluminum alloy. Fixed to the ends of the axis bar 13 are the members 14 and 15, on which the journal races are formed. The parts 14 and 15 are of a special ball bearing steel which is hardenable and capable of taking a high finish. After the parts 14 and 15 are assembled with the axis bar 13, the assembly is mounted on centers and the journal race surfaces 16 and 17 are ground to a high finish. In the example illustrated, the diameter of the races is one inch plus or minus 0.000025. At the same time the concentric surfaces 18 and 19 are ground in order to provide bearing surfaces for a striding level.

Encircling the races 16 and 17 are the outer bearing race members 22 and 23 which are formed of a similar hardened steel. The inside diameter of the cylindrical races is ground to 1.3123 inches plus or minus 0.000025. Between the inner and outer races are mounted a series of balls 21 which in the example illustrated are of very special quality. Their diameter is .15625 inches, plus or minus 0.000011. From the dimensions above stated, it is apparent that the interval between the inner and outer race of each bearing is less than the diameter of the ball by .0001 inch. It follows that each ball is pre-loaded and subject to actual distortion within the elastic range of the ball. The diameters given are typical and are intended to be merely illustrative.

The significant thing is that the inner race or journal turns within the outer race or bearing against rolling friction alone. There is no possible looseness. Moreover, such variations as may exist in the diameters of individual balls will average out with the result that the bearing moves for all practical purposes as precisely as the ground surfaces of the inner and outer races permit.

The outer bearing member 22 is the fixed or non-adjustable member. It is held in place by four counterbored screws 24. On its opposite faces it has two diametrically arranged ribs 25 and 26. These ribs extend horizontally. They engage plane surfaces which turn with the axis bar 13 and are strictly normal to the axis of rotation of the axis bar. One of these surfaces is the surface 27 formed on the member 14 at the inner end of journal 16. The other is the inner plane surface 28 of a disk 29 fixed to the end of the member 14. Here, it may be stated that the disk 29 is the support which carries the graduated limb of the theodolite. The interval measured across the edges of the diametric ribs 25 and 26 is precisely the interval between the surfaces 27 and 28. Vertical adjustment of the bearing member 23 is minute in extent and the resulting angular displacement of axis bar 13 is so slight that the axis bar is held against motion in an axial direction by the diametric ribs 25 and 26, in all adjusted positions of the axis bar.

The adjustable bearing 23 is held in place by three counterbored screws, one of which appears at 31 on Fig. 1. There is sufficient clearance around the screws to permit the bearing 23 to be shifted vertically and this vertical adjustment is made by means of three radial screws 32, one of which is visible in Fig. 1, and all three of which are visible in Fig. 3.

The screw clamp 33 may be set up to lock the arm 34 to the member 15. A tangent screw, not visible in the drawing, coacts with the lower end of the arm 34 to turn the axis bar on the horizontal axis. The construction is conventional so far as the clamp and tangent screw are concerned.

The balls 21 in each bearing are held in alignment by annular retainers 35. These are drilled radially to receive the balls 21 of each series and the retainers are positioned by and float on the balls.

The race ring 22 is grooved annularly on both faces and the race ring 23 is grooved annularly on one face to receive dust guards 36. Each guard is simply a ring of oil resisting rubber-like material, U-shaped in cross-section, as clearly shown in Fig. 1. The base of the U is cemented in the groove in which it is mounted and the two arms of the U seal in the opposite groove. The elasticity of the dust guard is more than sufficient to maintain seals in all adjusted positions of bearing 23.

It should be observed that the retainer rings 35 are not closely confined so that they permit the row of balls to move in the direction of the axis of the trunnion at least through a limited range. It will also be observed that if the geometrical axis of the race member 23 is so adjusted that it does not precisely align with the axis of the race member 22, the journal races 16 and 17 will be slightly cocked so that the balls will roll in a slightly elliptical path rather than a truly circular path.

This, in theory, is mechanically faulty, but not when one has a quantitive idea of the actual error. A section through journal race 16, normal to its axis, would be a true circle one inch in diameter. A section through bearing race 22 would be a true circle 1.323 inches in diameter. If we now assume that the axis bar is tilted from its ideal position by an angle as large as 15 minutes (and this is a relatively large figure), and if we also assume that the balls roll in a true circle on the inner journal and that the entire displacement is with reference to the outer race, the path of the balls on the outer race would be on an ellipse whose minor axis is 1.3123 and whose major axis is 1.3123 divided by the cosine of 15 minutes or 1.3123124. The probability however is that the balls would choose a path on the journal and in the bearing which would divide the error between the two so that the error above computed, small as it is, is probably twice what actually occurs.

Since the balls are under a pre-load of .0001 the error due to angular displacement would not materially effect the pre-load or the ability of the axis to rotate freely and truly. Somewhat similar geometrical considerations apply to the ribs which prevent end play of the axis bar.

It follows that the use of pre-loaded balls between cylindrical races gives free action and permits limited angular adjustment of the axis. Used with means to prevent axial displacement of the axis bar, a bearing of the type described very satisfactorily meets the requirements of the service. It is true, of course, that each ball has only slightly more than a point contact. However, the weight of the parts is not great, the instrument is carefully protected from shock, and the conditions as to wear are not severe.

While the invention has been described as applied to a particular theodolite and to particular bearings in that theodolite, the selection was made for illustrative purposes and with the idea of disclosing factors which would develop the practical possibilities of the concept. No necessary limitation to this particular environment is implied. Modifications within the scope of the claims are possible and contemplated.

What is claimed is:

1. In a geometrical instrument, the combination of a support including a pair of spaced standards; an angularly adjustable member having bearing-supporting trunnions provided with respective axially alined cylindrical ball bearing races about the alined axes of which said member is angularly adjustable; respective bearing members carried by said standards, each having a cylindrical ball race opposed to a corresponding trunnion ball race, one of said bearing members being adjustable on its standard by right-line translatory motion in a direction transverse to the axis of the trunnion; two annular series of bearing balls, one mounted under compression between each pair of opposed races; and means for resisting endwise motion of the trunnions relatively to the standards, effective in all adjusted positions of the adjustable bearing, said means being associated with the other bearing and comprising means affording oppositely presented plane surfaces turning with the trunnions and normal to the axis thereof, and stop means fixed relatively to the standards and shaped to enter into substantially diametric line contacts with both said surfaces, said line contacts approximating coincidence with the axis of tilt of the trunnion axis during adjustment of the adjustable bearing member.

2. The combination with the device defined in claim 1, of ball retainers which engage only the balls of a bearing to space and aline the same, said retainers and the balls having a limited freedom of motion in the direction of the axis of the trunnions.

3. The combination defined in claim 1 in which said stop means fixed relatively to the standards comprise diametric ribs lying in a common plane and projecting from the opposite end faces of the standard-carried bearing member.

4. The combination defined in claim 1 in which each standard-carried bearing member is annularly grooved, and the trunnions are provided with opposed faces which have registering annular grooves and universely flexible annular seals are provided and extend into opposed grooves, the flexibility of the annular seals being sufficient to accommodate the maximum adjustment.

5. In a geometrical instrument, the combination of a support including a pair of spaced standards; an angularly adjustable member having oppositely projecting supporting trunnions provided with respective axially alined cylindrical ball-bearing races, about the alined geometrical axes of which said member is angularly adjustable; respective bearing members carried by said standards, each having a cylindrical ball-race opposed to and forming a pair with a corresponding trunnion-carried ball-race, one of said bearing members being adjustably mounted on its standard so as to be shiftable in a direction transverse to the axis of the trunnion and the other being fixed; two annular series of bearing balls, one mounted under compression between the races of each pair; two annular ball retainers which engage only the balls of respective series to space and aline the balls, said retainers with the balls engaged thereby having limited freedom of motion axially relatively to the trunnion races; diametric thrust bosses on opposite ends of the fixed, standard-mounted race; and means affording opposed thrust faces engaging said bosses, said faces being carried by a trunnion and normal to the axis thereof.

HAROLD R. LARSEN.
DANIEL GURNEY.

REFERENCES CITED

The following references are of record in the file of this patent:

UNITED STATES PATENTS

| Number | Name | Date |
|---|---|---|
| 1,003,419 | Berger | Sept. 19, 1911 |
| 1,032,873 | Boyum | July 16, 1912 |
| 1,136,883 | Lietz | Apr. 20, 1915 |
| 1,162,125 | Basset | Nov. 30, 1915 |
| 1,622,880 | Perkins | Mar. 29, 1927 |
| 2,180,136 | Bates | Nov. 14, 1939 |
| 2,253,119 | Goerth | Aug. 19, 1941 |
| 2,311,815 | Briney | Feb. 23, 1943 |
| 2,363,877 | Larsen et al. | Nov. 28, 1944 |
| 2,411,870 | Chouvet | Dec. 3, 1946 |
| 2,523,983 | Arms | Sept. 26, 1950 |

FOREIGN PATENTS

| Number | Country | Date |
|---|---|---|
| 223,753 | Great Britain | 1924 |